(12) United States Patent
Serbanati et al.

(10) Patent No.: US 12,293,019 B2
(45) Date of Patent: May 6, 2025

(54) METHOD, COMPUTER PROGRAM AND HEAD-MOUNTED DEVICE FOR TRIGGERING AN ACTION, METHOD AND COMPUTER PROGRAM FOR A COMPUTING DEVICE AND COMPUTING DEVICE

(71) Applicant: Sony Group Corporation, Tokyo (JP)

(72) Inventors: Alexandru Serbanati, Stuttgart (DE); Dimitri Torfs, Stuttgart (DE); Francis M. Meyvis, Stuttgart (DE); Pierre Saelens, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 58 days.

(21) Appl. No.: 17/618,519

(22) PCT Filed: Jun. 17, 2020

(86) PCT No.: PCT/EP2020/066693
§ 371 (c)(1),
(2) Date: Dec. 13, 2021

(87) PCT Pub. No.: WO2020/260085
PCT Pub. Date: Dec. 30, 2020

(65) Prior Publication Data
US 2022/0236801 A1   Jul. 28, 2022

(30) Foreign Application Priority Data

Jun. 28, 2019 (EP) .................................... 19183121

(51) Int. Cl.
*G06F 3/01* (2006.01)
*G02B 27/01* (2006.01)
(Continued)

(52) U.S. Cl.
CPC ......... *G06F 3/015* (2013.01); *G02B 27/0172* (2013.01); *G06F 3/013* (2013.01);
(Continued)

(58) Field of Classification Search
CPC .............. G02B 27/0093; G02B 27/017; G02B 27/0172; G02B 2027/0138;
(Continued)

(56) References Cited

U.S. PATENT DOCUMENTS 9,894,326 B2   2/2018  Vaziri
2012/0235884 A1   9/2012  Miller et al.
(Continued)

FOREIGN PATENT DOCUMENTS

CN           108960937 A     12/2018
KR     10-2015-0081846 A      7/2015

OTHER PUBLICATIONS

International Search Report and Written Opinion mailed on Aug. 14, 2020, received for PCT Application PCT/EP2020/066693, Filed on Jun. 17, 2020, 10 pages.
(Continued)

*Primary Examiner* — Nelson M Rosario
(74) *Attorney, Agent, or Firm* — XSENSUS, LLP (57) ABSTRACT

A method and a head-mounted device for triggering an action with relation to a selected object in a field of view of a user comprising detecting a pre-defined brain activity pattern of the user using a brain activity sensor of a head-mounted device worn by the user. The pre-defined brain activity pattern expresses a user command to select an object on which a gaze of the user is focused. The method comprises determining a direction of the gaze of the user at a time of the detection of the pre-defined brain activity pattern. The method comprises capturing an image of the field of view of the user at the time of the detection of the pre-
(Continued)

defined brain activity pattern. The method comprises providing at least a part of the image to a computing entity, to cause the computing entity to trigger the action with relation to the selected object.

20 Claims, 3 Drawing Sheets

(51) Int. Cl.
    *G06F 3/0481* (2022.01)
    *G06V 20/20* (2022.01)

(52) U.S. Cl.
    CPC ............ *G06F 3/0481* (2013.01); *G06V 20/20* (2022.01); *G02B 2027/0138* (2013.01)

(58) Field of Classification Search
    CPC . G02B 2027/0187; G06F 3/013; G06F 3/015; G06F 3/0481; G06F 3/04842; G06V 20/20
    See application file for complete search history.

(56) References Cited

U.S. PATENT DOCUMENTS

| | | |
|---|---|---|
| 2015/0338917 A1* | 11/2015 | Steiner .................. H04L 9/3271 345/156 |
| 2017/0322679 A1 | 11/2017 | Gordon |
| 2018/0107274 A1 | 4/2018 | Li |
| 2018/0196511 A1 | 7/2018 | Chae |
| 2019/0004325 A1* | 1/2019 | Connor .............. G02B 27/0172 |
| 2019/0310472 A1* | 10/2019 | Schilt ...................... G06F 3/015 |
| 2021/0208680 A1* | 7/2021 | Tadi ........................ G06F 3/015 |
| 2022/0187607 A1* | 6/2022 | Hunt ........................ G02C 7/04 |

OTHER PUBLICATIONS

Simoens et al., "Vision: Smart Home Control with Head-Mounted Sensors for Vision and Brain Activity", Proceedings of the fifth international workshop on Mobile cloud computing & services, https://doi.org/10.1145/2609908.2609945, Jun. 2014, 5 pages.

Flumeri et al., "The Dry Revolution: Evaluation of Three Different EEG Dry Electrode Types in Terms of Signal Spectral Features, Mental States Classification and Usability", Sensors, Mar. 19, 2019, vol. 19, No. 6, 21 pages.

* cited by examiner

METHOD, COMPUTER PROGRAM AND HEAD-MOUNTED DEVICE FOR TRIGGERING AN ACTION, METHOD AND COMPUTER PROGRAM FOR A COMPUTING DEVICE AND COMPUTING DEVICE

CROSS-REFERENCE TO RELATED APPLICATIONS

The present application is based on PCT filing PCT/EP2020/066693, filed Jun. 17, 2020, which claims priority to EP 19183121.3, filed Jun. 28, 2019, the entire contents of each are incorporated herein by reference.

FIELD

Examples relate to a concept triggering an action with relation to a selected object in a field of view of a user, more specifically, but not exclusively, to a method and a head-mounted device for triggering an action with relation to a selected object in a field of view of a user, to a computing device and a method for a computing device, a system comprising the computing device and the head-mounted device, and to corresponding computer programs.

BACKGROUND

The development of user input methods is a field of research and development. For example, since the beginning of electrical systems, haptic buttons or levers have been used to operate machines, such as simple push buttons. In order to be able to operate more complex systems, these buttons were gradually combined into so-called keyboards, as they are still used today to operate computers. But other input devices, such as mice, are also used to operate user interfaces. Another possibility frequently used since the early 2000s to operate user interfaces is touchscreens (touch-sensitive display devices), in which the user can directly manipulate the user interface with a finger or a stylus (i.e. a pen for operating touchscreens).

Such user interfaces require a direct contact between the user that operate these user interfaces and the tactile interfaces (knobs, keys, touchscreens etc.) that are used to manipulate the respective user interfaces. In recent development, there are user interfaces that are uncoupled from tactile interfaces. One such development are augmented reality glasses, which are head-mounted devices, in which the user interface is projected into a field of view of the user. Using the augmented reality glasses, the view of the user may be "augmented" by displaying additional information about the objects in the field of view of the user, without completely obstructing the user from viewing the respective objects. One issue is the control of such head-mounted devices, which is often based on voice recognition, which may be controlled via a paired smartphone, or which may require the use of hands etc. This often leads to delays or errors in the controlling of such head-mounted devices.

There may be a desire for an improved concept for controlling a head-mounted device.

SUMMARY

This desire is addressed by the subject of the independent claims.

Embodiments of the present disclosure provide a method for triggering an action with relation to a selected object in a field of view of a user. The method comprises detecting a pre-defined brain activity pattern of the user using a brain activity sensor of a head-mounted device worn by the user. The pre-defined brain activity pattern expresses a user command to select an object on which the gaze of the user is focused. The method comprises determining a direction of the gaze of the user at a time of the detection of the pre-defined brain activity pattern. The method comprises capturing an image of the field of view of the user at the time of the detection of the pre-defined brain activity pattern. The method comprises providing at least a part of the image to a computing entity, to cause the computing entity to trigger the action with relation to the selected object.

Embodiments of the present disclosure further provide a method for a computing device. The method comprises receiving an image from a head-mounted device. The image is based on a direction of a gaze of a user at a time of a detection of a pre-defined brain activity pattern of a user wearing the head-mounted device. The pre-defined brain activity pattern expresses a user command to select an object on which a gaze of the user is focused. The method comprises determining information on the selected object within the image. The method comprises triggering the action with relation to the selected object based on the information on the selected object.

Embodiments of the present disclosure further provide a computer program having a program code for performing at least one of the methods, when the computer program is executed on a computer, a processor, or a programmable hardware component.

Embodiments of the present disclosure further provide a head-mounted device for triggering an action with relation to a selected object in a field of view of a user. The head-mounted device comprises a brain activity sensor for detecting brain activity patterns of a user wearing the head-mounted device. The head-mounted device comprises at least one sensor for determining a direction of a gaze of the user. The head-mounted device comprises at least one outward-oriented visual sensor for capturing an image of a field of view of the user. The head-mounted device comprises an interface for communicating with a computing entity. The head-mounted device comprises a processor configured to detect a pre-defined brain activity pattern of the user using the brain activity sensor. The pre-defined brain activity pattern expresses a user command to select an object on which a gaze of the user is focused. The processor is configured to determine a direction of the gaze of the user at a time of the detection of the pre-defined brain activity pattern. The processor is configured to capture an image of a field of view of the user at the time of the detection of the pre-defined brain activity pattern. The processor is configured to provide at least a part of the image to a computing entity, to cause the computing entity to trigger the action with relation to the selected object.

Embodiments of the present disclosure further provide a computing device. The computing device comprises an interface for communicating with a head-mounted device. The computing device comprises a processor configured to receive an image from the head-mounted device via the interface. The image is based on a direction of a gaze of a user at a time of a detection of a pre-defined brain activity pattern of a user wearing the head-mounted device. The pre-defined brain activity pattern expresses a user command to select an object on which a gaze of the user is focused. The processor is configured to determine information on the selected object within the image. The processor is configured to trigger the action with relation to the selected object based on the information on the selected object.

Embodiments of the present disclosure further provide a system comprising the head-mounted device and the computing device.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples of the present disclosure are based on the finding that, in order to trigger an action in relation to an object in a field of view of a user, brain activity sensors may be used. When using brain activity sensors, such as Electroencephalography (EEG) sensors, specific brain activity patterns of a user wearing such a sensor may be distinguished. In embodiments of the present disclosure, a specific and pre-defined brain activity pattern is associated with a user command to select an object on which a gaze of the user is focused. This brain activity pattern may e.g. be pre-defined by the system, i.e. the user may be trained to produce said specific brain activity pattern, or it may be user-specific, i.e. the user may be asked to supply the specific brain activity pattern in a training phase. Once the brain activity pattern is detected, an action with relation to an object in a field of view of a user on which the gaze of the user is focused is triggered. To identify the object, the direction of the gaze of the user may be determined and an image of the field of view of the user may be taken. The image (e.g. a part of the image that contains the object) is subsequently transmitted to a computing entity that analyzes the image and triggers the desired action.

Figure 1A:
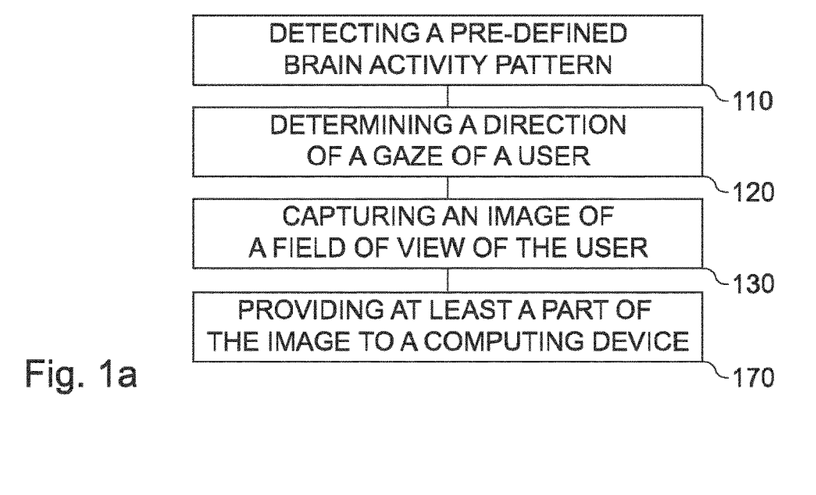
FIGS. 1a and 1b show flow charts of embodiments of a method for triggering an action with relation to a selected object in a field of view of a user.
Figure 1B:
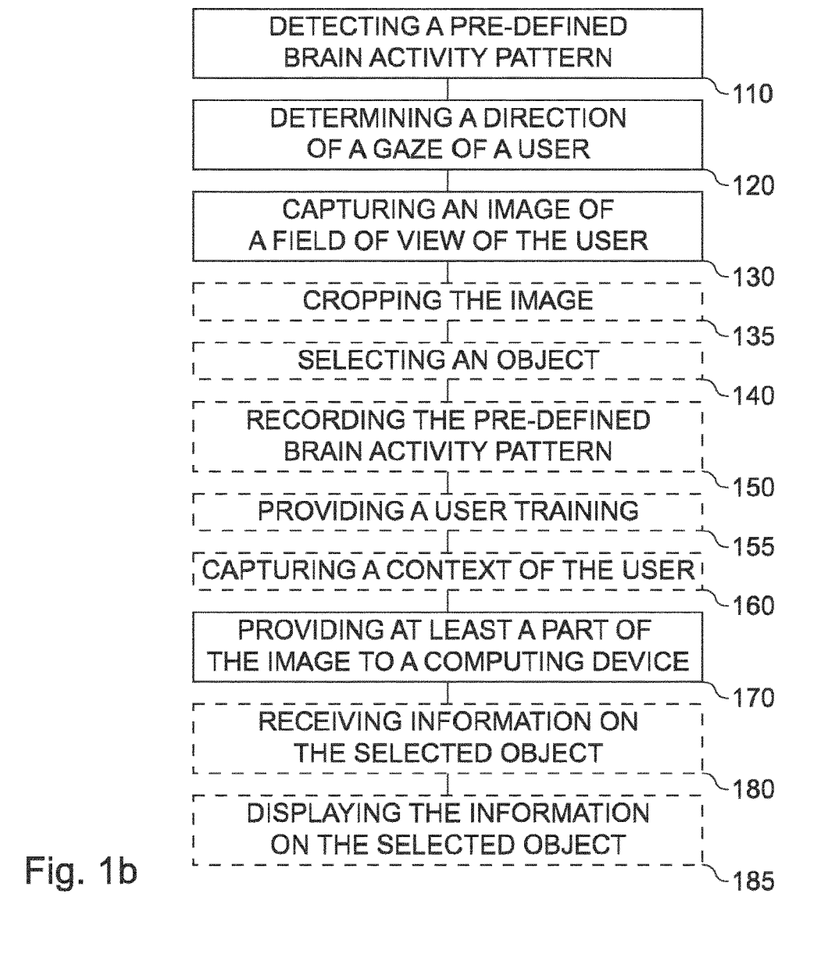

FIGS. 1a and 1b show flow charts of embodiments of a method for triggering an action with relation to a selected object in a field of view of a user. The method comprises detecting 110 a pre-defined brain activity pattern of the user using a brain activity sensor of a head-mounted device worn by the user. The pre-defined brain activity pattern expresses a user command to select an object on which a gaze of the user is focused. The method comprises determining 120 a direction of the gaze of the user at a time of the detection of the pre-defined brain activity pattern. The method comprises capturing 130 an image of the field of view of the user at the time of the detection of the pre-defined brain activity pattern. The method comprises providing 170 at least a part of the image to a computing entity 30, to cause the computing entity to trigger the action with relation to the selected object. For example, the method may be executed by the head-mounted device.

Figure 2A:
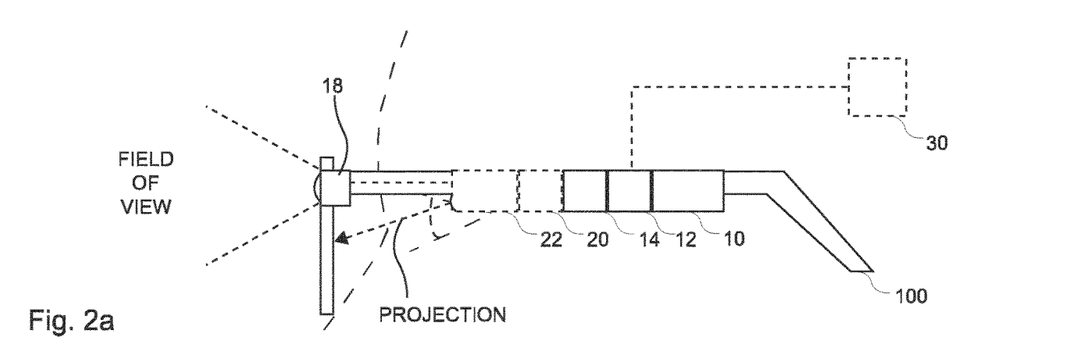
FIGS. 2a and 2b show schematic diagrams of embodiments of a head-mounted device.
Figure 2B:
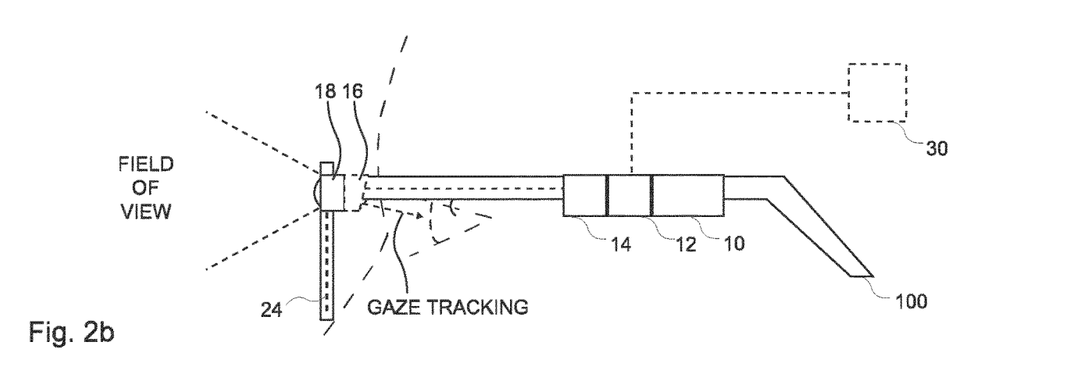

FIGS. 2a and 2b show schematic diagrams of embodiments of a head-mounted device 100. For example, the head-mounted device 100 may be suitable for executing the method of FIG. 1a and/or 1b. The head-mounted device 100 comprises a brain activity sensor 10 for detecting brain activity patterns of a user wearing the head-mounted device. The head-mounted device 100 comprises at least one sensor 16; 20 for determining a direction of a gaze of the user. The head-mounted device 100 comprises at least one outward-oriented visual sensor 18 for capturing an image of a field of view of the user. The head-mounted device 100 comprises an interface 12 for communicating with a computing entity 30. The head-mounted device 100 comprises a processor 14 that is coupled to the interface 12, to the at least one sensor 16; 20 for determining the direction of the gaze of the user, and to the outward-oriented visual sensor 18. Additionally, the processor may be coupled to a projector 22 or to a translucent display 24. For example, the processor 14 may be configured to execute the method of FIGS. 1a and/or 1b, e.g. in conjunction with the above-mentioned further components of the head-mounted device 100. For example, the processor 100 is configured to detect a pre-defined brain activity pattern of the user using the brain activity sensor. The pre-defined brain activity pattern expresses a user command to select an object on which a gaze of the user is focused. The processor 14 is configured to determine a direction of the gaze of the user at a time of the detection of the pre-defined brain activity pattern. The processor 14 is configured to capture an image of a field of view of the user at the time of the detection of the pre-defined brain activity pattern. The processor 14 is configured to provide at least a part of the image to a computing entity, to cause the computing entity to trigger the action with relation to the selected object. FIGS. 2a and 2b further show a system comprising the head-mounted device 100 and the computing device 20.

The following description relates to both the method of FIGS. 1a and/or 1b and to the head-mounted device 100 of FIGS. 2a and/or 2b.

Embodiments of the present disclosure relate to a head-mounted device 100 and a method for triggering an action with relation to a selected object in a field of view of a user. For example, a user may wear the head-mounted device. The head-mounted device may be an augmented reality headset, i.e. a headset in which additional information is displayed as an overlay over the "real" objects (i.e. physical objects) that are visible in the field of view of the user. The user may use the head-mounted device to obtain information about the "real" objects in the field of view of the user. To achieve this, the user may generate a brain activity pattern that expresses a desire of the user to initiate a selection of an object of the field of view of the users. In other words, the brain activity pattern expresses a user command to select the object on which a gaze of the user is focused. For example, the brain activity pattern may be a "mental click" e.g. a mental user command to select the object on which a gaze of the user is focused.

For example, the object may be a physical object, i.e. an object that is physically present in the environment of the user, such as another person, an animal, a building, a tree, a machine etc., or written text, e.g. an informational graphic, such as a train timetable, a road sign, or a restaurant menu. Alternatively, the object may be a virtual object, e.g. an element of a graphical user interface being shown to the user. For example, the graphical user interface may be shown to the user on an external screen, or on a translucent display 24 comprised in the head-mounted device, or as a projection provided by a projector 22 of the head-mounted device. For example, the element of the graphical user interface may be a button, a toggle or a selection field.

To trigger the action relating to the selected object, the object may be selected. The selection of the object may be performed by the head-mounted device, using the processor of the head-mounted device, or may be performed by the computing entity, e.g. based on the at least part of the image provided to the computing entity. For example, the method may comprise selecting 140 the object by determining the object on which the gaze of the user is focused in the captured image based on the direction of the gaze of the user. For example, based on the direction of the gaze of the user, a part of the captured image may be isolated, and the object being present within the part of the image may be selected. Within the part of the image, the object may be recognized and/or distinguished using object recognition, e.g. based on a contrast between the object and adjacent objects.

The method and head-mounted device are suitable for triggering an action relating to the selected object. In this context, "(suitable) for triggering an action" means that the method and head-mounted device are suitable for performing, or configured to perform, actions that lead to the action being triggered, e.g. by the computing device. The method and/or head-mounted device might not themselves trigger the action, but the action might be triggered due to the processing of the image by the computing entity.

The action to be triggered relates to the selected object. For example, as stated above, the user may desire to obtain information on the selected object. The information on the selected object may be displayed (or output through text-to-speech) by the head-mounted device. Accordingly, the action to be triggered may be, comprise or consist of the head-mounted display displaying information on the selected object using a visual display of the head-mounted device. As introduced above, the visual display may be a translucent display or a projector of the head-mounted device. Alternatively, the user may desire to trigger an action within the graphical user interface, e.g. select a button or toggle. Accordingly, the action to be triggered may be a selection of an element of a graphical user interface. The element of the graphical user interface may be the selected object.

In general, the action to be triggered may be defined by the user, by the head-mounted device or by the computing entity. For example, the action to be triggered may be determined by the user before or after the detection of the pre-defined brain activity pattern. For example, the action to be triggered may be defined by the user in advance, e.g. as a permanent setting or immediately before the detection of the pre-defined brain activity pattern. For example, when the user is moving about an unfamiliar place, the user might set the head-mounted device to a setting of "show information", which would set the action to be triggered to the head-mounted display displaying information on the selected object using a visual display of the head-mounted device, or the user might activate the user interface, thereby setting the action to be triggered to a selection of an element of the graphical user interface. Alternatively, after the pre-defined brain activity pattern has been the detected, the user may be asked to specify the action to be taken, e.g. using voice control or other user interfaces, such as a mobile-based graphical user interface (which may e.g. be provided using the computation device or the head-mounted device), hardware buttons on the head-mounted device etc.

Alternatively, the action to be triggered may be derived from the context the user is presently in. The action to be triggered may be based on the context of the user. For example, the context of the user may be based on a location of the user or based on an activity of the user, e.g. whether the user is in front of a controllable machine or whether the user moves within an unfamiliar city, or whether the user views a physical object or whether the user views a user interface. In other words, the action to be triggered may depend on the selected object, e.g. based on a category (physical object, text, element of a user interface) of the selected object. The method may comprise capturing 160 the context of the user. For example, the context of the user may be determined based on the location of the user, or based on an activation status of a graphical user interface, or based on the selected object.

To initiate the process, the pre-defined brain activity pattern of the user is detected. This detection may be performed on-device, i.e. by the head-mounted device. In other words, the pre-defined activity pattern is detected 110 using a processor of the head-mounted device. The pre-defined brain activity pattern is detected using the brain activity sensor of the head-mounted device. In this context, the term "brain activity sensor" does not necessarily refer to a single sensor. Rather, the term "brain activity sensor" may be understood as abstract term, and may encompass one or more brain activity sensors that are attached to the skull of the user via one or more brain activity monitoring electrodes. For instance, the brain activity sensor may be an Electroencephalography (EEG) sensor that is attached to the skull (i.e. the skin of the skull) using two or more electrodes.

In at least some embodiments, the brain activity sensor may be an EEG sensor that is mountable to the skull of the user using two or more "dry" electrodes that are pressed against the skull by the head-mounted device. For example, the head-mounted device including an array of sensors may keep the dry electrodes located correctly with respect to the head. In contrast to "wet" electrodes, "dry" electrodes might not require gels or conductive substances to be applied between the electrode and the skin. Dry electrodes may e.g. be based on silicone conductive rubber, comb-like and multi-pin electrodes, gold-plated electrodes, bristle-type electrodes, or the EEG sensor may be foam-based. For example, the dry electrodes may be based on a spiky contact (a regular pattern of spikes of the electrodes come into direct contact with the skull), a capacitive or non-contact (through non-conductive materials), or the electrodes may be based on other materials, such as foams or solid gels. For example, the dry electrodes may be integrated in the head-mounted device.

In some embodiments, the head-mounted device may be implemented as a headband. In this case, the dry electrodes may be affixed to the inner side of the headband, making direct contact to the skin (or even the skull) of the user. Alternatively, the head-mounted device may be implemented as smart eyeglasses. In this case, the dry electrodes may be affixed to the temple stem the smart eyeglasses, making direct contact to the skin (or even the skull) of the user.

The pre-defined brain activity pattern expresses a user command to select an object on which a gaze of the user is focused. In other words, the pre-defined brain activity pattern may be associated with a desire of the user to select the object on which the gaze of the user is focused. Accordingly, the pre-defined brain activity pattern may be a brain activity pattern that is generated by the user at will, i.e. a deliberately generated brain activity pattern. Furthermore, the pre-defined brain activity pattern is pre-defined, i.e. it is defined before the detection of the pre-defined brain activity pattern is to be carried out.

To define the pre-defined brain activity pattern, the user may train the head-mounted device on a user-specific pattern, e.g. using a calibration program. For example, the user may be requested to reproduce a specific thought the user associates with the selection of the object on which the gaze of the user is focused. The user may be prompted to repeatedly generate the thought, e.g. at a specific time. The brain activity pattern being caused by the thought may be recorded. In other words, the method may comprise recording 150 the pre-defined brain activity pattern using the brain activity sensor of the head-mounted device, e.g. repeatedly recording 150 the pre-defined brain activity pattern using the brain activity sensor of the head-mounted device. The pre-defined brain activity pattern may be detected based on the recording of the pre-defined brain activity pattern. In this case, the pre-defined brain activity pattern may be user-specific, i.e. based on the thought selected by the user to be associated with selecting the object. In other words, the pre-defined brain activity pattern may be a user-specific brain activity pattern.

Alternatively, the pre-defined brain activity pattern may be non-user-specific, i.e. the pre-defined brain activity pattern may be suitable for different users. In other words, the pre-defined brain activity pattern may be a non-user-specific brain activity pattern. To enable the user to trigger the action, the user may be trained to reproduce said pre-defined brain activity pattern. Accordingly, the method may comprise providing 155 a user training to train the user to produce (or reproduce) the pre-defined brain activity pattern. For example, the pre-defined brain activity pattern may be commonly associated with a mental image that is similar for multiple users, e.g. a mental image associated with a desire to trigger an action. For example, the mental image may be associated with a desire of the user of pressing a button, hitting a ball, opening a door etc. In the training, the user may be presented with words or images representing the mental image, and shown an index representing a match between the current brain activity pattern of the user and the pre-defined brain activity pattern.

The method comprises determining 120 the direction of the gaze of the user at a time of the detection of the pre-defined brain activity pattern. For example, the gaze of the user may be determined on-device, i.e. using the processor of the head-mounted device. In some embodiments, the determination of the direction of the gaze may be triggered by the detection of the pre-defined brain activity pattern, i.e. the sensor may start recording after the pre-defined brain activity pattern has been detected. Alternatively, the detection of the pre-defined brain activity pattern may occur concurrently with the determination of the direction of the gaze, i.e. the direction of the gaze of the user may be determined periodically, e.g. before the time of the detection of the pre-defined brain activity pattern, at the time of the detection of the pre-defined brain activity pattern or after the detection of the pre-defined brain activity pattern, and the direction of the gaze of the user at the time of the detection of the pre-defined brain activity pattern may be extrapolated or interpolated from the periodically determined direction of the gaze of the user.

Various sensors may be used to determine the direction of the gaze of the user. In some embodiments, as shown in FIG. 2b, the direction of the gaze is determined 120 using either at least one inward-oriented visual or infrared sensor 16 of the head-mounted device. In this context, inward-oriented visual or infrared sensor refers to a sensor that is designated for taking a recording of the user (i.e. the eyes of the user), as opposed to an environment of the user. In other words, the inward-oriented visual or infrared sensor may be directed at the user, and the outward-oriented visual or infrared sensor may be directed away from the user. For example, the head-mounted device may comprise one inward-oriented visual or infrared sensor for each eye of the user (suitable for recording the movement of the respective eye), or one inward-oriented visual or infrared sensor that is suitable for recording the movement of both eyes. The method may comprise analyzing the movement of the user's eye or eyes that are recorded using the at least one inward-oriented visual or infrared sensor 16 of the head-mounted device to determine the direction of the gaze of the user, e.g. by tracking a position of the iris of the respective eye. For example, the at least one inward-oriented optical sensor 16 may be capable of sensing infrared radiation, i.e. the movement of the user's eye or eyes may be determined based on infrared light being reflected by the user's eye or eyes. Alternatively or additionally, the direction of the gaze of the user may be determined by measuring the electro-magnetic field generated by the contraction of the muscles of the eye or eyes (of the user). Accordingly, as shown in FIG. 2a, the head-mounted device 100 may comprise a sensor 20 suitable for measuring the electro-magnetic field generated by the contraction of the muscles of the eye. Based on the measured electro-magnetic field, the direction of the gaze of the user may be determined, e.g. by comparing the measured electro-magnetic field to reference values for different directions of the user's gaze (which may have been obtained from a user-specific calibration of the respective sensor).

The method comprises capturing 130 an image of the field of view of the user at the time of the detection of the pre-defined brain activity pattern, e.g. using at least one outward-oriented visual sensor 18 of the head-mounted device. In this context, outward-oriented visual sensor refers to a sensor that is capable of recording the environment of the user, as opposed to the user him- or herself. For example, the outward-oriented visual sensor may be an outward-oriented camera. The capturing of the image of the field of the view of the user may be triggered by the detection of the pre-defined brain activity pattern, i.e. the at least one outward-oriented visual sensor may start recording after the pre-defined brain activity pattern has been detected. Alternatively, the detection of the pre-defined brain activity pattern may occur concurrently with the capturing 130 an image of the field of view of the user, i.e. the image of the field of view of the user may be captured periodically, e.g. before the time of the detection of the pre-defined brain activity pattern, at the time of the detection of the pre-defined brain activity pattern or after the detection of the pre-defined brain activity pattern, and the image of the field of view of the user at the time of the detection of the pre-defined brain activity pattern may be extrapolated or interpolated from the periodically determined direction of the gaze of the user. In some embodiments, a graphical user interface as seen by the user may be superimposed on the image (or replace the image if the user is currently using the graphical user interface).

To capture the field of view of the user, the head-mounted device may capture the entire feasible field of view of the user, using a wide-angle lens, or the field of view of the user may be pre-selected, e.g. based on the direction of the field of view of the user (or both). For example, the image comprises a wide-angle field of view (e.g. having a horizontal angle of view of at least 60°, or at least 70° or at least 80°). To generate the wide-angle field of view, the at least one outward-oriented visual sensor 18 may be equipped with a wide-angle lens, e.g. a lens having a focal length of at most 35 mm equivalent (to 35 mm film format). Alternatively or additionally, the image may comprise a close-angle field of view (e.g. having a horizontal angle of view of at most 60°, or at most 50°, at most 30°, at most 20°). Accordingly, the at least one outward-oriented visual sensor 18 may be equipped with a telephoto lens, e.g. a lens having a focal length of more than 35 mm equivalent (to 35 mm film format), e.g. at least 50 mm equivalent, at least 60 mm equivalent, at least 85 mm equivalent. In some embodiments, the close-angle field of view may be captured based on the direction of the gaze of the user, e.g. an orientation of the at least one outward-oriented visual sensor may be adjusted based on the direction of the gaze of the user, or the close-angle field of view may be used if the direction of the gaze of the user coincides with the orientation of the at least one outward-oriented visual sensor. For example, the at least one outward-oriented visual sensor may be equipped with a telephoto lens and a wide-angle lens having (substantially) the same orientation. The corresponding close-angle field of view may be comprise in the wide-angle field of view provided by the wide-angle lens, e.g. and may be at the center of the wide-angle field of view. The close-angle field of view may be used for the image if the direction of the gaze of the user is directed at (i.e. intersects with) the close-angle field of view. In some embodiments, the image may comprise both the wide-angle field of view and the close-angle field of view, e.g. superimposed to provide more detail of the field of view at the direction of the gaze (or the center of the field of view), or separately.

The method comprises providing 170 at least a part of the image to the computing entity 30. In some embodiments, the (entire) image is provided 170 to the computing entity with information on the direction of the gaze of the user. In this case, the object may be selected by the computing entity based on the information on the direction of the gaze of the user. Alternatively, the method may comprise cropping 135 the image based on the direction of the gaze of the user, i.e. trimming the image to (only) include a part of the image that intersects with the direction of the gaze of the user, e.g. thereby isolating the selected object. The method may comprise providing 170 the cropped image (i.e. the part of the image) to the computing entity.

For example, the computing entity 30 may be either a backend server, for example a dedicated server, a virtual server, a server instance or a datacenter. The backend server may be responsible for analyzing the at least part of the image of a plurality of head-mounted devices. The backend server may be suitable for (i.e. configured to) analyze the at least part of the image and to trigger the (desired) action with relation to the selected object based on the at least part of the image. The image may be transmitted to the backend server via the internet (e.g. via a mobile communication system and/or via a mobile device). Alternatively, the computing device may be a mobile device, such as a smartphone, a tablet computer, a laptop computer or a wearable device, which may be owned by the user. The image may be transmitted to the mobile device via a wireless connection, e.g. via a (local) mobile communication system such as WiFi, Bluetooth or NFC (Near Field Communication).

The image may be transmitted to the computing entity to cause the computing entity to trigger the action with relation to the selected object. For example, an instruction for triggering the action with relation to the selected object may be included with the image. Alternatively, the image may be an explicit instruction or triggering the action with relation to the selected object.

In some embodiments, the head-mounted device receives feedback on the provided image, e.g. an acknowledgement about a reception of the image or a confirmation that the action has been triggered. In some cases, the computing entity may provide information to be displayed by the head-mounted device in response to the image. For example, the method may comprise receiving 180 information on the selected object from the computing entity, e.g. in response to the provided image. The information on the selected object may be the feedback on the provided image. For example, the information on the selected may comprise information about the selected object, e.g. a description of the object, background information on the object etc. For example, the selected object may be building. In this case, the information on the object may comprise information about a history, size, purpose etc. of the building. Alternatively, the selected object may be a person. In this case, the information on the object may comprise information about a name, a description, a job etc. of the person. Alternatively, the object may be plants, landmarks etc., where general information on the object may be provided. The method may comprise displaying 185 the information on the selected object using a visual display 22; 24 of the head-mounted device. In other words, the processor of the head-mounted device may be configured to receive information on the selected object from the computing entity 30, and to display the information on the selected object in the field of view of the user using the visual display 20 of the head-mounted device. For example, the information on the selected object may be displayed as an overlay in the field of view of the user, e.g. overlaid over the selected object or side-by-side with the selected object. This may e.g. be achieved using projection technology or using a translucent/transparent display (the terms are used interchangeably in the context of the present disclosure). For example, the information on the selected object may be projected into a field of view of the user. For example, at least one eyeglass of the head-mounted device may serve as projection surface of the projection. Accordingly, as shown in FIG. 2a, the visual display may comprise a projector 22. Alternatively or additionally, the visual display of the head-mounted device may comprise a translucent (i.e. transparent) display, e.g. an Organic Light Emitting Diode (OLED)-based transparent/translucent display. The translucent/transparent display may be integrated within eyeglasses of the head-mounted device, or may be manually brought into the field of view of the user by the user himself, e.g. using a hinge mechanism. As shown in FIG. 2b, the information on the selected object may be displayed within the field of view of the user using the translucent display 24. Alternatively or additionally, the method may comprise outputting the information on the selected object using an audio output, e.g. a loudspeaker or headphones.

In general, the interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information. For example, the interface 12 may be configured to communicate in a mobile communication system. In general, the cellular mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. For example, the interface 12 may be configured to communicate with the mobile device or with the backend server via the mobile communication system, e.g. locally or via the internet.

In embodiments the processor 14 may be implemented using one or more processing units, one or more processing devices, any means for processing, such as a general purpose processor, a computer or a programmable hardware component being operable with accordingly adapted software. In other words, the described function of the processor 14 may as well be implemented in software, which is then executed on one or more programmable hardware components. Such hardware components may comprise a general purpose processor, a Digital Signal Processor (DSP), a micro-controller, etc.

Figure 3A:
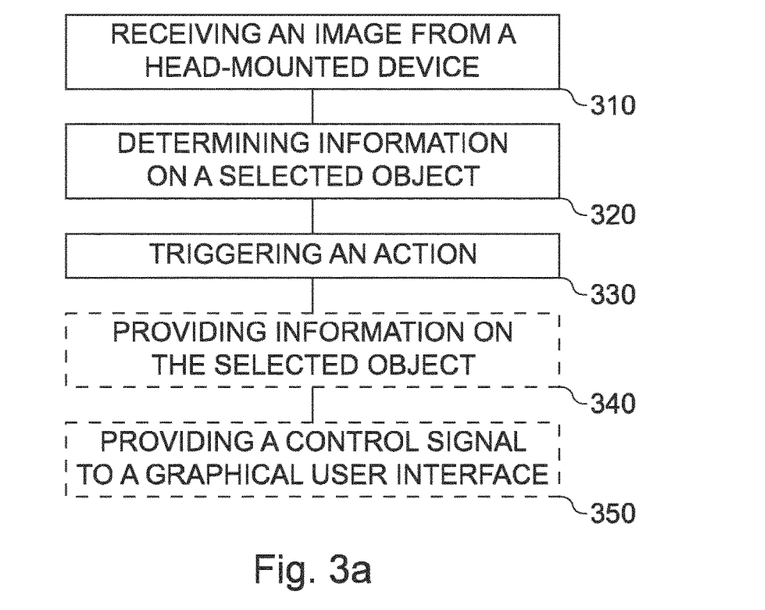
FIG. 3a shows a flow chart of an embodiment of a method for a computing device.

FIG. 3a shows a flow chart of an embodiment of a method for a computing device 30. As shown in connection with FIGS. 1a to 2b, the computing device may be a backend server or a mobile device. The method comprises receiving 310 an image from a head-mounted device, the image being based on a direction of a gaze of a user at a time of a detection of a pre-defined brain activity pattern of a user wearing the head-mounted device. The pre-defined brain activity pattern expresses a user command to select an object on which a gaze of the user is focused. The method comprises determining 320 information on the selected object within the image, e.g. using a machine-learning technique. The method comprises triggering 330 the action with relation to the selected object based on the information on the selected object. For example, the method may be executed by the computing device 30.

Figure 3B:
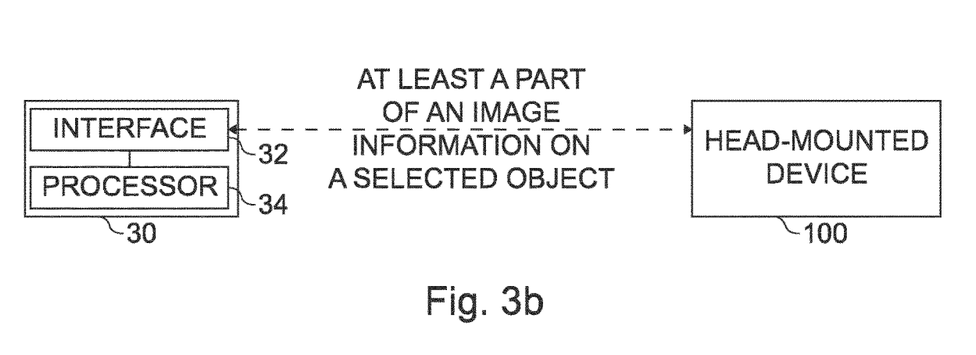
FIG. 3b shows a block diagram of an embodiment of a computing device.

FIG. 3b shows a block diagram of an embodiment of a (corresponding) computing device 30. The computing device comprises an interface 32 for communicating with a head-mounted device. The computing device comprises a processor 34 that is coupled with the interface 32. The processor may be configured to execute the method of FIG. 3a, e.g. in conjunction with the interface 32. For example, the processor 34 is configured to receive an image from the head-mounted device via the interface. The image is based on a direction of a gaze of a user at a time of a detection of a pre-defined brain activity pattern of a user wearing the head-mounted device. The pre-defined brain activity pattern expresses a user command to select an object on which a gaze of the user is focused. The processor 34 is configured to determine information on the selected object within the image, e.g. using a machine-learning technique. The processor 34 is configured to trigger the action with relation to the selected object based on the information on the selected object. FIG. 3b further shows a system comprising the head-mounted device 100 and the computing device 30 according to claim.

The following description relates to both the method of FIG. 3a and the computing device of FIG. 3b.

At least some embodiments relate to a computing device and to a corresponding method for a computing device. This computing device is a counterpart for the head-mounted device 100 introduced in connection with FIGS. 1a to 2b. In other words, the computing device may be used to trigger the action with relation to the selected object based on the image provided by the head-mounted device 100, as introduced in connection with FIGS. 1a to 2b.

Accordingly, the method comprises receiving 310 the image from the head-mounted device. The image may be the "at least part of the image" introduced in connection with FIGS. 1a to 2b. In some embodiments, the received image is the (entire) image captured by the head-mounted device. Alternatively, the received image may be a cropped version of the image captured by the head-mounted device. The image is based on a direction of a gaze of a user at a time of a detection of a pre-defined brain activity pattern of a user wearing the head-mounted device. In some embodiments, e.g. if the received version is the cropped version of the image captured by the head-mounted device, the cropping of the image is based on the direction of the gaze of the user, so that the received image is (also) based on the direction of the gaze of the user. Alternatively, the image may comprise information on the direction of the gaze of the user (or information on the gaze of the user may be included with the image). In this case, the method may comprise cropping the received image based on the information on the direction of the gaze of the user (e.g. similar to the cropping introduced in connection with FIGS. 1a to 2b).

The method comprises determining 320 information on the selected object within the image, e.g. using a machine-learning technique or using any other kind of algorithm. For example, the information on the selected object may be determined using a machine-learning model, using the received image as input for the machine-learning model. For example, the machine-learning model may be used to perform object recognition on the received image, to identify the selected object. Alternatively or additionally, the machine-learning model may be used to identify an object of one or more objects visible within the image on which the gaze of the user has focused (and which is to be selected). In other words, the method may comprise selecting the object by determining the object on which the gaze of the user is focused in the image based on the direction of the gaze of the user, e.g. using the machine-learning technique or using an image-processing algorithm. Alternatively or additionally, the machine-learning model or other techniques, such as image-processing algorithms, may be used to identify and/or isolate the selected object within the received image, e.g. by determining whether the object is a building, a person, a plant, text or an element of a graphical user interface, or (even) by recognizing the building, the person, the plant, the text, or which element of the graphical user interface is selected using the machine-learning model. In some embodiments, the machine-learning model or a heuristics-based software translation algorithm may be used to translate text that is visible within the received image. For example, the method may comprise retrieving information on the selected object from an object database, e.g. based on the identification of the object and, optionally, based on a location of the object relative to the user wearing the head-mounted device, or based on additional context information known to the system from other sources (e.g. location, user identifier etc.). Alternatively, e.g. in case the action to be triggered is a selection of an element of a graphical user interface, a machine-learning model or a selection algorithm may be used to determine the element of the graphical user interface that is to be selected, e.g. based on the position of the element of the graphical user interface or based on a previous usage pattern of the user within the graphical user interface. In this case, the machine-learning technique is not necessarily based on a machine-learning model, but might be a simpler machine-learning technique, such as an index of functions previously used by the user or a probability index of the usage of functions within the graphical user interface, that is based on the context of the user, or another approach may be used, such as a heuristic approach.

Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. Machine-learning algorithms are usually based on a machine-learning model.

In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine. Support vector machines (i.e. support vector networks) are supervised learning models with associated learning algorithms that may be used to analyze data, e.g. in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The method comprises triggering 330 the action with relation to the selected object based on the information on the selected object. For example, the action may be triggered by providing the head-mounted device with information on the selected object, by controlling an operating system or by controlling a graphical user interface (of the mobile device, the head-mounted device or an external graphical user interface, e.g. of an automated teller machine or of an external screen). For example, the action to be triggered may be the head-mounted display displaying the information on the selected object using a visual display of the head-mounted device. The method may comprise providing 340 the information on the selected object to the head-mounted device. For example, the information on the selected object may be provided via the internet, via a wireless connection between the mobile device and the head-mounted device (if applicable). Subsequently, the information on the selected object may be displayed by the visual display of the head-mounted device, or it may be output using an audio output of the head-mounted device. Alternatively, the action to be triggered may be a selection of an element of a graphical user interface. The element of the user interface may be the selected object. The triggering of the action may comprise providing 350 a control signal to the graphical user interface, to cause the graphical user interface to select the element. For example, the control signal may be provided to a graphical user interface of the mobile device, to a graphical user interface of the head-mounted device, or to a graphical user interface of a device that is external to (both) the mobile device and the head-mounted device, e.g. a graphical user interface of an external device that the user is standing in (close) proximity to. For example, the control signal may be provided via the internet, via a wireless connection between the mobile device and the head-mounted device (if applicable) or via a wireless connection between the mobile device and the external device (if applicable).

In general, the interface 32 may correspond to one or more inputs and/or outputs for receiving and/or transmitting information, which may be in digital (bit) values according to a specified code, within a module, between modules or between modules of different entities. For example, the interface 32 may comprise interface circuitry configured to receive and/or transmit information. For example, the interface 32 may be configured to communicate in a mobile communication system. In general, the cellular mobile communication system may, for example, correspond to a cellular mobile communication system as described in connection with FIGS. 1a to 1c. For example, the interface 32 may be configured to communicate with the head-mounted device 100 via the mobile communication system, e.g. locally or via the internet.

In embodiments the processor 34 may be implemented using one or more processing units, one or more processing devices, any means for processing, such as a general purpose processor, a computer or a programmable hardware component being operable with accordingly adapted software. In other words, the described function of the processor 34 may as well be implemented in software, which is then executed on one or more programmable hardware components. Such hardware components may comprise a general purpose processor, a Digital Signal Processor (DSP), a micro-controller, etc.

More details and aspects of the computing device and the method are mentioned in connection with the proposed concept or one or more examples described above (e.g. FIG. 1a to 2b). The computing device and the method may comprise one or more additional optional features corresponding to one or more aspects of the proposed concept or one or more examples described above or below.

Information exchange and rapid fruition is a key aspect of contemporary development. For what concerns content fruition and interaction, computer users are nowadays often familiar with the "Point and Click" paradigm for activating features of a given IT system. This has been extended with the touch interfaces that build on top of existing point and click paradigm. This kind of interfaces rely on the use of a Graphical User Interface (GUI) to provide visual output to the User and contextualize the input of the user based on the position of a pointer on a screen.

On the other hand, several technologies aim at providing real time augmented information based on images extracted from the user context using image analysis. The limit of these approaches, which may be overcome by at least some embodiments, is that the user still needs to use an external device (e.g. a smartphone) to perform this task, which, in turn has two major impacts: it does not use the native point of view of the user, and it isn't hands-free.

Embodiments aim at building on the natural way of observing of the environment and might not require a GUI for the selection of the focus area. Moreover, the interaction might not require any movement from the user.

A system is proposed for the thought-triggered fruition of text- and video-based augmented information about the object(s) the user focuses on. The system may activate without requiring the user to lose track of the things he is focusing on and can continue tracking the object(s) even when the user blinks his eyes.

At least some embodiments of the present disclosure relate to a concept denoted "Look and Think". Embodiments may provide a head-mounted system (i.e. glasses), e.g. the head-mounted device 100, which provide a user with information about the objects he is looking at (e.g. the selected object).

The user may be trained to produce a specific brain activity pattern (e.g. the pre-defined brain activity pattern) and the system (e.g. the head-mounted device) may be trained to recognize this pattern. The user may produce this pattern to activate the system.

In that moment, or around that moment, a small-form-factor camera (e.g. the at least one inward-oriented visual or infrared sensor) looking at his eye(s) may capture the direction of his view (e.g. the direction of his gaze). An outward camera (e.g. the at least one outward-oriented visual sensor) may capture the field of view of the user. The part of the image that the user is looking at may be retrieved by combining the direction retrieved by the inward-looking camera and the field of view of the outward-looking one. At least this part of the image may be then sent to a service (e.g. the computation device) to be analyzed and the information resulting from the analysis (e.g. the information on the selected object) may be provided to the user through the glasses as text, images or video.

On top of the regular uses, this system can support/complement the sight of visually impaired users and can be also used to provide information to people who, due to physical disabilities, cannot access regular Information Technology (IT) systems.

The system may use custom glasses, goggles or other head-mounted devices to monitor brain activity, monitor the looking-direction of the user, shoot a picture of the user's field of view, provide the user with information about the content of the picture.

At least some embodiments may be based on triggering an event based on brain activity pattern recognition. Embodiments may comprise retrieving the direction that the user focuses on (e.g. the direction of the gaze of the user), retrieving the image of the field of view of the user, sending the image to a local or cloud service (e.g. the computing device) to be analyzed, e.g. using machine-learning techniques, and, (optionally), displaying the additional information to the user.

One or more assumptions may underlie at least some of the embodiments. For example, at least some embodiments may be based on one or more of the following assumptions:
  a) the glasses (head-mounted device) have processing capability
  b) the glasses have internet connectivity (or alternatively local connectivity to a device that can provide the required image-analysis services)
  c) the glasses (or generically the device) have a brain activity sensor, e.g. an array of EEG (Electroencephalography) sensors on their arms/stems (i.e. in their structure)

d) the glasses have a (optionally) moving close-angle camera on the front of the glasses that takes a picture in the direction the user is looking into or a wide angle, low aperture camera or a wide-angle camera (e.g. the outward-oriented visual sensor)
e) the glasses have a low-resolution, small-form-factor camera (e.g. the inward-oriented visual or infrared sensor) looking towards the eyes (or other sensors for determining the direction of the gaze),
f) the glasses can display information to the user overlapped with the current image the user is seeing. Different technologies can be used here (projection, embedded light guides, . . . )
g) the user himself has been trained to be able to produce a replicable thought (e.g. the pre-defined brain activity pattern), which is further denoted as "select" thought pattern
h) the system was trained to detect the "Select" pattern when it occurs In the following, the activity of an embodiment of the present disclosure is detailed along with the assumptions. Aspects of the embodiment may also be applied to examples or embodiments introduced above or below.

1. The electrodes (e.g. of the brain activity sensor) may sense (c) in real-time the brain activity of the user. When the processing (a), e.g. the processor of the head-mounted device, identifies the given brain user pattern for "Select" (g) as trained in (h), point 2 is triggered
2. The eye-looking camera (e) installed in the end of the glasses arms may watch the eyes of the user and derives the direction of sight (e.g. the direction of the gaze)
3. the outwards-looking camera (d) may take a picture and the image is (optionally) cropped around the direction of sight of the user
4. The image generated at point 3 may be sent to a cloud service (e.g. the computation device) to be analyzed. This can be performed by the glasses themselves or by a smartphone that has the gateway role (b)
5. The service may then (optionally) return the augmented information (e.g. the information on the selected object) which will be displayed on the semitransparent lens of the glass Embodiments of the present disclosure use the natural human way of observing the environment: it doesn't require a GUI for the selection of the focus area. Moreover, the interaction might not require any movement from the user.

The system may activate without requiring the user to lose track of the things he is focusing on and can continue training the object(s) even when the user blinks his eyes.

On top of the regular uses, this system can support/complement the sight of visually impaired users and can be also used to provide information to people who, due to physical disabilities, cannot access regular IT systems.

Embodiments may e.g. be used with helmets, AR glasses (Augmented Reality glasses), goggles, VR headsets (Virtual Reality headsets). For example, the head-mounted device 100 may be one of AT glasses, goggles or a VR headset.

The following examples pertain to further embodiments:

(1) A method for triggering an action with relation to a selected object in a field of view of a user, the method comprising:
Detecting a pre-defined brain activity pattern of the user using a brain activity sensor of a head-mounted device worn by the user, the pre-defined brain activity pattern expressing a user command to select an object on which a gaze of the user is focused;
Determining a direction of the gaze of the user at a time of the detection of the pre-defined brain activity pattern;
Capturing an image of the field of view of the user at the time of the detection of the pre-defined brain activity pattern; and
Providing at least a part of the image to a computing entity, to cause the computing entity to trigger the action with relation to the selected object.
(2) The method according to (1) comprising selecting the object by determining the object on which the gaze of the user is focused in the captured image based on the direction of the gaze of the user.
(3) The method according to one of (1) or (2) further comprising cropping the image based on the direction of the gaze of the user, and providing the cropped image to the computing entity.
(4) The method according to one of (1) to (3), wherein the image is provided to the computing entity with information on the direction of the gaze of the user.
(5) The method according to one of (1) to (4), wherein the pre-defined activity pattern is detected using a processor of the head-mounted device, and/or wherein the direction of the gaze is determined using a processor of the head-mounted device.
(6) The method according one of (1) to (5), wherein the computing entity is either a) a backend server, the image being transmitted to the backend server via the internet, or b) a mobile device, the image being transmitted to the mobile device via a wireless connection.
(7) The method according to one of (1) to 63), wherein the direction of the gaze is determined using either a) at least one inward-oriented visual or infrared sensor of the head-mounted device or b) by measuring the electro-magnetic field generated by the contraction of the muscles of the eye.
(8) The method according to one of (1) to (7), wherein the image is captured using at least one outward-oriented visual sensor of the head-mounted device.
(9) The method according to (8), wherein the image comprises a wide-angle field of view, the at least one outward-oriented visual sensor being equipped with a wide-angle lens,
and/or wherein the image comprises a close-angle field of view, the at least one outward-oriented visual sensor being equipped with a telephoto lens.
(10) The method according to one of (1) to (9), further comprising receiving information on the selected object from the computing entity, and displaying the information on the selected object using a visual display of the head-mounted device.
(11) The method according to (10), wherein the information on the selected object is displayed as an overlay in the field of view of the user
and/or wherein the information on the selected object is projected into a field of view of the user, the visual display comprising a projector,
and/or wherein the visual display of the head-mounted device comprises a translucent display, the information on the selected object being displayed within the field of view of the user using the translucent display.
(12) The method according to one of (1) to (11), further comprising capturing a context of the user, the action to be triggered being based on the context of the user.

(13) The method according to one of (1) to (12), wherein the action to be triggered is determined by the user before or after the detection of the pre-defined brain activity pattern,
or wherein the action to be triggered depends on the selected object.
(14) The method according to one of (1) to (13), wherein the action to be triggered is the head-mounted display displaying information on the selected object using a visual display of the head-mounted device,
or wherein the action to be triggered is a selection of an element of a graphical user interface, the element being the selected object.
(15) The method according to one of (1) to (14), wherein the pre-defined brain activity pattern is a user-specific brain activity pattern, the method comprising recording the pre-defined brain activity pattern using the brain activity sensor of the head-mounted device.
(16) The method according to one of (1) to (15), wherein the pre-defined brain activity pattern is a non-user-specific brain activity pattern, the method comprising providing a user training to train the user to produce the pre-defined brain activity pattern.
(17) A head-mounted device for triggering an action with relation to a selected object in a field of view of a user, the head-mounted device comprising:
a brain activity sensor for detecting brain activity patterns of a user wearing the head-mounted device;
at least one sensor for determining a direction of a gaze of the user;
at least one outward-oriented visual sensor for capturing an image of a field of view of the user;
an interface for communicating with a computing entity; and
a processor configured to:
Detect a pre-defined brain activity pattern of the user using the brain activity sensor, the pre-defined brain activity pattern expressing a user command to select an object on which a gaze of the user is focused,
Determine a direction of the gaze of the user at a time of the detection of the pre-defined brain activity pattern,
Capture an image of a field of view of the user at the time of the detection of the pre-defined brain activity pattern, and
Provide at least a part of the image to a computing entity, to cause the computing entity to trigger the action with relation to the selected object.
(18) The head-mounted device according to (17) further comprising a visual display, the processor being configured to receive information on the selected object from the computing entity, and to display the information on the selected object in the field of view of the user using the visual display of the head-mounted device.
(19) A method for a computing device, the method comprising:
Receiving an image from a head-mounted device, the image being based on a direction of a gaze of a user at a time of a detection of a pre-defined brain activity pattern of a user wearing the head-mounted device, the pre-defined brain activity pattern expressing a user command to select an object on which a gaze of the user is focused;
Determining information on the selected object within the image; and
Triggering the action with relation to the selected object based on the information on the selected object.
(20) The method according to (19), wherein the action to be triggered is the head-mounted display displaying the information on the selected object using a visual display of the head-mounted device, the method comprising providing the information on the selected object to the head-mounted device.
(21) The method according to one of (19) or (20), wherein the action to be triggered is a selection of an element of a graphical user interface, the element being the selected object, the triggering of the action comprising providing a control signal to the graphical user interface, to cause the graphical user interface to select the element.
(22) A computing device comprising:
an interface for communicating with a head-mounted device; and
a processor configured to:
Receive an image from the head-mounted device via the interface, the image being based on a direction of a gaze of a user at a time of a detection of a pre-defined brain activity pattern of a user wearing the head-mounted device, the pre-defined brain activity pattern expressing a user command to select an object on which a gaze of the user is focused,
Determine information on the selected object within the image,
Trigger the action with relation to the selected object based on the information on the selected object.
(23) A system comprising the head-mounted device according to one of (17) or (18) and the computing device according to (22).
(24) A computer program having a program code for performing at least one of the methods according to one of (1) to (16) or (19) to (21), when the computer program is executed on a computer, a processor, or a programmable hardware component.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for triggering an action with relation to a selected object in a field of view of a user, the method comprising:
   detecting a pre-defined brain activity pattern of the user using a brain activity sensor of a head-mounted device worn by the user, the pre-defined brain activity pattern expressing a user command to select an object on which a gaze of the user is focused;
   upon detection of the pre-defined brain activity pattern, determining a direction of the gaze of the user based on measurement of electromagnetic fields generated by eye muscle contractions and capturing an image of the field of view of the user, the measurement of the electromagnetic fields generated by the eye muscle contractions being compared with reference values for different directions of gaze in order to determine the direction of the gaze of the user; and
   providing at least a part of the image to a computing entity, to cause the computing entity to trigger the action with relation to the selected object.

2. The method according to claim 1, comprising selecting the object by determining the object on which the gaze of the user is focused in the captured image based on the direction of the gaze of the user.

3. The method according to claim 1, further comprising cropping the image based on the direction of the gaze of the user, and providing the cropped image to the computing entity.

4. The method according to claim 1, wherein the image is provided to the computing entity with information on the direction of the gaze of the user.

5. The method according to claim 1, wherein the pre-defined activity pattern is detected using a processor of the head-mounted device, and/or wherein the direction of the gaze is determined using a processor of the head-mounted device.

6. The method according to claim 1, wherein the computing entity is either a) a backend server, the image being transmitted to the backend server via the internet, or b) a mobile device, the image being transmitted to the mobile device via a wireless connection.

7. The method according to claim 1, wherein the image is captured using at least one outward-oriented visual sensor of the head-mounted device.

8. The method according to claim 7, wherein the image comprises a wide-angle field of view, the at least one outward-oriented visual sensor being equipped with a wide-angle lens,
   and/or wherein the image comprises a close-angle field of view, the at least one outward-oriented visual sensor being equipped with a telephoto lens.

9. The method according to claim 1, further comprising receiving information on the selected object from the computing entity, and displaying the information on the selected object using a visual display of the head-mounted device.

10. The method according to claim 1, wherein the method further comprises capturing a context of the user, the action to be triggered being based on the context of the user,
    or wherein the action to be triggered is determined by the user before or after the detection of the pre-defined brain activity pattern,
    or wherein the action to be triggered depends on the selected object.

11. The method according to claim 1, wherein the action to be triggered is the head-mounted display displaying information on the selected object using a visual display of the head-mounted device,
  or wherein the action to be triggered is a selection of an element of a graphical user interface, the element being the selected object.

12. The method according to claim 1, wherein the pre-defined brain activity pattern is a user-specific brain activity pattern, the method comprising recording the pre-defined brain activity pattern using the brain activity sensor of the head-mounted device.

13. The method according to claim 1, wherein the pre-defined brain activity pattern is a non-user-specific brain activity pattern, the method comprising providing a user training to train the user to produce the pre-defined brain activity pattern.

14. A non-transitory computer-readable medium storing a computer program having a program code that, when executed by a processor, cause the processor to perform the method according to claim 1.

15. The method according to claim 1, wherein the selected object is a virtual object.

16. A head-mounted device for triggering an action with relation to a selected object in a field of view of a user, the head-mounted device comprising:
  a brain activity sensor to detect brain activity patterns of a user wearing the head-mounted device;
  at least one sensor to determine a direction of a gaze of the user;
  at least one outward-oriented visual sensor to capture an image of a field of view of the user;
  an interface to communicate with a computing entity; and
  a processor configured to:
    detect a pre-defined brain activity pattern of the user using the brain activity sensor, the pre-defined brain activity pattern expressing a user command to select an object on which a gaze of the user is focused,
    upon detection of the pre-defined brain activity pattern, determine a direction of the gaze of the user based on measurement of electromagnetic fields generated by eye muscle contractions and capture an image of a field of view of the user, the measurement of the electromagnetic fields generated by the eye muscle contractions being compared with reference values for different directions of gaze in order to determine the direction of the gaze of the user, and
    provide at least a part of the image to a computing entity, to cause the computing entity to trigger the action with relation to the selected object.

17. A method for a computing device, the method comprising:
  receiving an image from a head-mounted device, the image being based on a direction of a gaze of a user determined upon detection of a pre-defined brain activity pattern of a user wearing the head-mounted device, the pre-defined brain activity pattern ex-pressing a user command to select an object on which a gaze of the user is focused, the gaze of the user being determined based on measurement of electromagnetic fields generated by eye muscle contractions, the measurement of the electromagnetic fields generated by the eye muscle contractions being compared with reference values for different directions of gaze in order to determine the direction of the gaze of the user;
  determining information on the selected object within the image; and
  triggering the action with relation to the selected object based on the information on the selected object.

18. The method according to claim 17, wherein the action to be triggered is the head-mounted display displaying the information on the selected object using a visual display of the head-mounted device, the method comprising providing the information on the selected object to the head-mounted device,
  or wherein the action to be triggered is a selection of an element of a graphical user interface, the element being the selected object, the triggering of the action comprising providing a control signal to the graphical user interface, to cause the graphical user interface to select the element.

19. A non-transitory computer-readable medium storing a computer program having a program code that, when executed by a processor, cause the processor to perform the method according to claim 17.

20. A computing device comprising:
  an interface for communicating with a head-mounted device; and
  a processor configured to:
    receive an image from the head-mounted device via the interface, the image being based on a direction of a gaze of a user determined upon detection of a pre-defined brain activity pattern of a user wearing the head-mounted device, the pre-defined brain activity pattern expressing a user command to select an object on which a gaze of the user is focused, the gaze of the user being determined based on measurement of electromagnetic fields generated by eye muscle contractions, the measurement of the electromagnetic fields generated by the eye muscle contractions being compared with reference values for different directions of gaze in order to determine the direction of the gaze of the user,
    determine information on the selected object within the image,
    trigger the action with relation to the selected object based on the information on the selected object.

* * * * *